US009363792B2

(12) United States Patent
Choi et al.

(10) Patent No.: US 9,363,792 B2
(45) Date of Patent: Jun. 7, 2016

(54) APPARATUS METHOD AND COMPUTER PROGRAM ELEMENT FOR EFFICIENT CONTROL AND SUPERVISION OF THE ACTIVITY OF A COMMUNICATION DEVICE

(75) Inventors: Hyung-Nam Choi, Hamburg (DE); Michael Eckert, Braunschweig (DE); Holger Schmidt, Braunschweig (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 2200 days.

(21) Appl. No.: 11/668,651

(22) Filed: Jan. 30, 2007

(65) Prior Publication Data

US 2007/0177628 A1    Aug. 2, 2007

(30) Foreign Application Priority Data

Jan. 30, 2006   (DE) .......................... 10 2006 004 250

(51) Int. Cl.
*H04M 1/00* (2006.01)
*H04W 72/02* (2009.01)
*H04W 76/04* (2009.01)
*H04W 80/02* (2009.01)
*H04L 1/18* (2006.01)

(52) U.S. Cl.
CPC .............. *H04W 72/02* (2013.01); *H04L 1/188* (2013.01); *H04W 76/04* (2013.01); *H04W 80/02* (2013.01)

(58) Field of Classification Search
CPC ............ H04W 72/04; H04W 72/0446; H04W 72/0453; H04W 72/02; H04W 76/04; H04W 80/02; H04L 1/188
See application file for complete search history.

(56) References Cited

U.S. PATENT DOCUMENTS

| 2005/0111430 | A1  | 5/2005 | Spear et al. |
| 2005/0141471 | A1* | 6/2005 | Virtanen et al. .............. 370/342 |
| 2006/0052137 | A1* | 3/2006 | Randall et al. ................ 455/560 |
| 2007/0073895 | A1* | 3/2007 | Sebire et al. .................. 709/230 |
| 2007/0135080 | A1* | 6/2007 | Islam et al. ................ 455/343.1 |

FOREIGN PATENT DOCUMENTS

CN          1669341 A      9/2005
WO    WO-2005/064977 A1   7/2005

OTHER PUBLICATIONS

3GPP TR 25.903 V0.1.1 (Nov. 2005); *Technical Report*; 3rd Generation Partnership Project; Technical Specification Group Radio Access Network; Continuous Connectivity for Packet Data Users; (Release 7).
3GPP TS 25.301 V6.4.0 (Sep. 2005); *Technical Specification*; 3rd Generation Partnership Project; Technical Specification Group Radio Access Network; Radio Interface Protocol Architecture (Release 6).
ETSI TS 125 331 V5.13.0 (Jun. 2005); *Technical Specification*; Universal Mobile Telecommunications System (UMTS); Radio Resource Control (RRC) protocol specification (3GPP TS 25.331 version 5.13.0 Release 5).
Chinese Patent Office; First Office Action for Chinese App. No. 200710007917.4 mailed Jun. 19, 2009; 3 pages of English translation.
* cited by examiner

*Primary Examiner* — Ajit Patel
(74) *Attorney, Agent, or Firm* — Schwabe, Williamson & Wyatt, P.C.

(57) ABSTRACT

The communication device has three useful data transmission states, where the communication device in the first and in the second state has associated first communication resources and in the third state has associated second communication resources, with the second communication resources being fewer than the first communication resources. Provision is made for there to be state changes from the first state to the second state, from the second state to the third state, from the third state to the first state and from the second state to the first state.

31 Claims, 7 Drawing Sheets

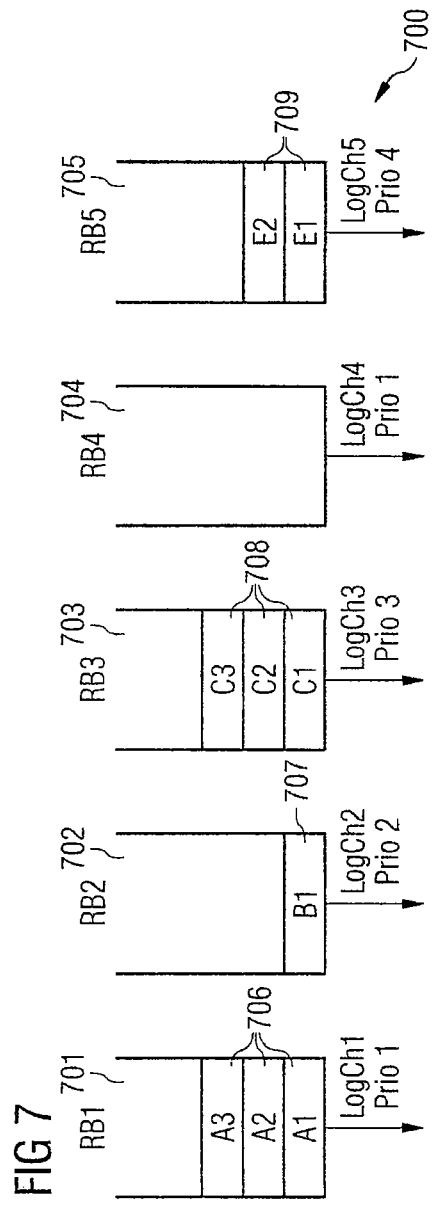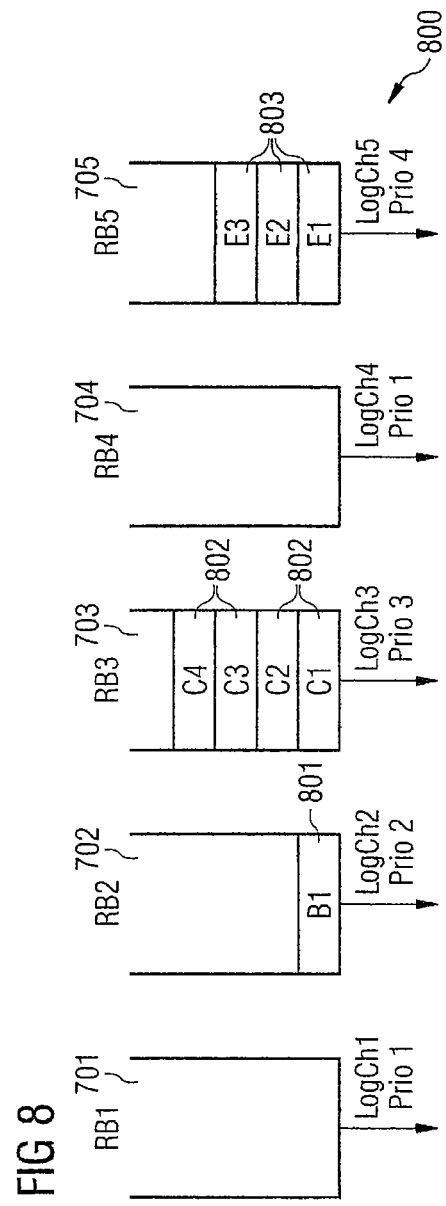

APPARATUS METHOD AND COMPUTER PROGRAM ELEMENT FOR EFFICIENT CONTROL AND SUPERVISION OF THE ACTIVITY OF A COMMUNICATION DEVICE

CROSS-REFERENCE TO RELATED APPLICATION

This application claims priority to German Patent Application Serial No. 10 2006 004 250.6, which was filed Jan. 30, 2006, and is incorporated herein by reference in its entirety.

TECHNICAL FIELD

The invention relates to a communication device, a method for operating a communication device and a computer program element.

BACKGROUND OF THE INVENTION

In modern mobile radio communication systems, it is usual for mobile radio subscriber terminals to be allocated radio resources on the basis of their current activity. Efficient methods for radio resource allocation and radio resource release are desirable.

BRIEF DESCRIPTION OF THE FIGURES

In the figures,

FIG. 7 shows RLC buffer store filling levels based on an exemplary embodiment of the invention;

FIG. 8 shows RLC buffer store filling levels based on another exemplary embodiment of the invention;

DESCRIPTION OF THE INVENTION

Figure 1:
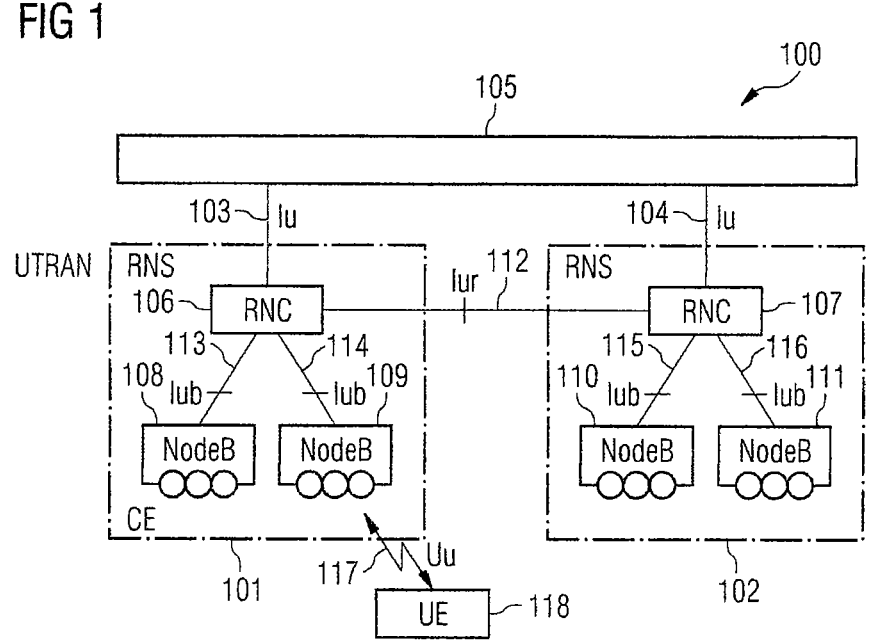
FIG. 1 shows a communication system based on an exemplary embodiment of the invention.

In a mobile radio communication system based on the UMTS (Universal Mobile Telecommunications System) communication standard, two types of transport channels are defined in the uplink transmission direction (i.e. for data transmission from a mobile radio communication terminal to a mobile radio base station): what are known as the dedicated channels (DCH) and the shared channels (Random Access Channel, RACH).

When a mobile radio communication link is intended to be set up between a subscriber terminal, subsequently also called a mobile radio communication terminal (in line with UMTS also called User Equipment, UE), and the mobile radio communication network, the current traffic situation in a mobile radio cell and the requested quality of service (QoS) are taken as a basis for the RRC (Radio Resource Control) protocol layer in the mobile radio network control unit (Radio Network Controller, RNC) to allocate either dedicated radio resources or shared radio resources for the mobile radio communication terminal. The DCH radio resources are allocated to a mobile radio communication terminal permanently for as long as the dedicated mobile radio communication link exists.

The fundamental properties of a dedicated transport channel are the short transmission delay, the transmission of data at high data rates of up to 2 Mbps (net), the power efficiency as a result of closed-loop power control, and the gain as a result of macrodiversity.

Accordingly, the fundamental properties of a common or shared transport channel are the relatively long transmission delay, the transmission of data at only low or average data rates, and the power inefficiency as a result of open-loop power control.

In the face of the channel properties described, it would thus be advantageous, from the point of view of the user, if a dedicated communication link were always set up for a mobile radio communication link in the uplink transmission direction (i.e. in the transmission direction from a mobile radio communication terminal to a mobile radio base station, for example) and in the downlink transmission direction (i.e. in the transmission direction from a mobile radio base station to a mobile radio communication terminal, for example).

In the case of dedicated communication links, however, there is always the problem of restricted availability in a mobile radio cell: in the downlink, in other words in the downlink transmission direction, the availability is restricted by the limited number of available "Downlink Scrambling Codes". In the uplink, in other words in the uplink transmission direction, the availability is restricted by the maximum permissible interference in the mobile radio cell.

For this reason, the mobile radio network control unit uses what are known as RRC states at RRC protocol layer level to supervise and control the mobile radio resources associated with a mobile radio communication terminal on the basis of the respective traffic load in the mobile radio cell and the mobile radio communication terminal activity.

This means that if, by way of example, a mobile radio communication terminal is in the RRC state CELL_DCH and is currently receiving or sending only little data using the dedicated resources then the mobile radio network control unit can use explicit signaling at RRC protocol layer level to arrange a transition of the operating state of the mobile radio communication terminal to the RRC state CELL_FACH. In this case, the dedicated mobile radio communication link is cleared down and in the new RRC state CELL_FACH the packet data transmission is then continued using the shared mobile radio resources. If the activity of the mobile radio communication terminal increases again and the respective traffic load in the mobile radio cell so permits, then it is possible to set up a new dedicated mobile radio communication link, likewise by means of explicit signaling at RRC protocol layer level.

To date, controlling and supervising the mobile radio resources associated with a mobile radio communication terminal using RRC messages and setting up a dedicated mobile radio communication link has been relatively slow, which means that it is desirable to keep a mobile radio communication terminal in the RRC state CELL_DCH for as long as possible, even when the mobile radio communication terminal is temporarily inactive.

For this reason, the 3GPP (3rd Generation Partnership Project) committees are currently examining methods which allow a significant increase in the number of subscribers or their mobile radio communication terminals which are in the RRC state CELL_DCH.

Possible solutions for the uplink transmission direction can be seen, inter alia, in restricting the transmission using the physical transmission channels (which are required in order to maintain the dedicated mobile radio communication link) of the inactive subscriber terminals or mobile radio communication terminals, so that the interference in the mobile radio cell can be reduced as a whole.

This requires criteria on the basis of which the "activity" or "inactivity" of a subscriber or of a mobile radio communication terminal needs to be stipulated.

One possible simple definition of "inactivity" of a mobile radio communication terminal would be if all RLC (Radio Link Control) buffer stores in the subscriber terminal were empty.

Accordingly, a simple definition of "activity" of a mobile radio communication terminal would be if at least one data packet were to be in at least one RLC buffer store.

However, this type of definition would be inefficient because it would easily result in what are known as "ping-pong" effects, in other words it would result in frequent state changes (also called state transitions) from the "activity" state to the "inactivity" state and vice versa from the "inactivity" state to the "activity" state. This is disadvantageous, however, since changeover operations and state transitions in the mobile radio communication terminal physically require certain time delays.

In line with one exemplary embodiment of the invention, the data transmission involves reducing what is known as the "ping-pong" effect when controlling and supervising the activity or inactivity.

A communication device based on an exemplary embodiment of the invention has a state control unit which is set up such that it can operate the communication device in at least the following three useful data transmission states:
  a first useful data transmission state, in which a useful data communication link with first communication resources is allocated to the communication device to,
  a second useful data transmission state, in which a useful data communication link with first communication resources is allocated to the communication device,
  a third useful data transmission state, in which a useful data communication link with second communication resources is allocated to the communication device, the second communication resources being fewer than the first communication resources.

In addition, the communication device has a state transition control unit which is set up such that it can perform at least the following state transitions:
  a first state change from the first useful data transmission state to the second useful data transmission state when a first state transition criterion has been met,
  a second state change from the second useful data transmission state to the third useful data transmission state when a second state transition criterion has been met,
  a third state change from the third useful data transmission state to the first useful data transmission state when a third state transition criterion has been met, and
  a fourth state change from the second useful data transmission state to the first useful data transmission state when a fourth state transition criterion has been met.

In a method for operating a communication device based on an exemplary embodiment of the invention, the communication device is operated in a first useful data transmission state, in which a useful data communication link with first communication resources is allocated to the communication device. A first state change from the first useful data transmission state to a second useful data transmission state is performed when a first state transition criterion has been met, where in the second useful data transmission state a useful data communication link with first communication resources is allocated to the communication device. In addition, a third state change from a third useful data transmission state to the first useful data transmission state is performed when a third state transition criterion has been met. A second state change from the second useful data transmission state to the third useful data transmission state is performed when a second state transition criterion has been met. In the third useful data transmission state, a useful data communication link with second communication resources is allocated to the communication device, the second communication resources being fewer than the first communication resources. A fourth state change from the second useful data transmission state to the first useful data transmission state is performed when a fourth state transition criterion has been met.

In addition, in line with one exemplary embodiment of the invention, a computer program element for operating a communication device is provided which, when executed by a processor, comprises the steps of the method for operating a communication device which are described above.

Embodiments of the invention can be implemented in software, i.e. using one or more computer programs, in hardware, i.e. using a specific electronic circuit, or in hybrid form, i.e. in software or hardware in arbitrary proportions.

The embodiments described for the invention apply both to the communication device and, if appropriate, mutatis mutandis to the method for operating the communication device and to the computer program element.

The communication device may be set up as a radio communication device, for example as a mobile radio communication device, for example as a cell-based mobile radio communication device. This means that the mobile radio communication device may be set up on the basis of a mobile radio communication standard from the second generation or from the third generation or from a subsequent generation, such as on the basis of
  Global System for Mobile Communications (GSM),
  General Packet Radio Service (GPRS),
  Enhanced Data-Rates for GSM Evolution (EDGE),
  Universal Mobile Telecommunications System (UMTS),
  Code Division Multiple Access 2000 (CDMA200),
  Freedom of Mobile Multimedia Access (FOMA), etc.

Thus, by way of example, the mobile radio communication device may be set up on the basis of a communication standard based on a 3rd Generation Partnership Project communication standard (3GPP) or based on a 3rd Generation Partnership Project 2 (3GPP2) communication standard.

If the communication device is in the form of a radio communication device, then the communication resources are radio communication resources, for example. If the communication device is in the form of a mobile radio communication device then the communication resources are mobile radio communication resources, for example.

By way of example, communication resources are to be understood to mean access rights to logical channels, transport channels or physical channels and also parameters used for data transmission, such as frequency, time window, data rates, CDMA spreading codes, error rates, etc.

The expression "fewer" communication resources is to be understood to mean access rights which are less powerful or less extensive in terms of communication options or restricted data transmission parameters, for example.

In line with one embodiment of the invention, the state control unit is set up such that the useful data transmission states are states from the data link layer, in other words from the communication protocol layer 2, based on the OSI (Open System Interconnection) reference model from the ISO (International Standardization Organization).

The state control unit may be set up such that the useful data transmission states are states from the Medium Access Control layer (MAC layer). Alternatively, the state control unit may be set up such that the useful data transmission states are states from the RLC (Radio Link Control) protocol layer or a subordinate protocol layer from the MAC layer, such as the MAC-d protocol layer or the MAC-e protocol layer.

In other words, one exemplary embodiment of the invention provides for the states to be states at the communication protocol layer level 2, i.e. the data link layer, and a state machine is therefore provided in the protocol layer 2.

When the invention is being used in a UMTS communication system, for example, the state control unit may be set up such that the useful data transmission states are states from the CELL_DCH state or from the Long_Term_Evolution_Active state (LTE_Active state).

The state transition control unit may be contained in the Medium Access Control layer control unit, which, in line with one embodiment of the invention, is provided, in other words implemented, in the communication device.

In line with another embodiment of the invention, the state control unit is set up such that it can operate the communication device in precisely the three useful data transmission states described above. In other words, the state machine based on this embodiment of the invention has precisely the three states described above and the state transitions described above.

In addition, the state control unit may be set up such that the useful data transmission states are substates from a first transmission state from a set of several transmission states. The substates are subsequently also referred to as phases from the respective transmission state.

In line with one exemplary embodiment of the invention, a state machine having a plurality of transmission states is therefore provided in the communication device, possibly at communication protocol layer level 2, with one of the transmission states having a plurality of substates, as were described above.

In line with one embodiment of the invention, the first transmission state from the plurality of transmission states is a state in which the communication device has set up at least one signaling communication link, possibly in addition to an existing useful data transmission communication link.

In addition, the state control unit may be set up such that the first transmission state is a state in which the communication device has associated dedicated communication resources, for example dedicated transport channels or dedicated physical channels, for example one or more Dedicated Channels (DCH) on the basis of UMTS.

Furthermore, the state control unit may be set up such that the second transmission state is a state in which the communication device has set up at least one signaling communication link, for example likewise in addition to an existing useful data transmission communication link. On the basis of this embodiment of the invention, provision may be made for the second transmission state to be a state in which the communication device has associated shared communication resources to which other communication devices also have access, in other words what are known as common or shared communication resources, for example jointly used transport channels or jointly used physical channels, on the basis of UMTS, for example the Random Access Channel (RACH) in the uplink transmission direction or the FACH (Forward Access Channel) in the downlink transmission direction, are used. In addition, the state control unit may be set up such that the second transmission state is a CELL_FACH state or a Long_Term_Evolution_Idle state.

Depending on the communication standard used, additional transmission states with respective characteristic individual properties may also be provided.

By way of example, a UMTS communication system may also be provided with the following three transmission states, which can be provided by the state control unit and have their relevant transmission properties: CELL_PCH; URA_PCH; Idle Mode.

In the case of the future UMTS communication system currently under discussion, in which only three RRC states will probably be provided, the state control unit may be set up such that in addition to the transmission states described above a Long_Term_Evolution_Detached state is available and provided in which the communication device can be operated.

The communication resources can have access to physical control channels, with the access to physical control channels being able to be restricted for the second communication resources in comparison with the first communication resources, as a result of which the communication device in the third useful data transmission state is provided with fewer mobile radio resources, in this case on account of fewer available control channels and hence also fewer available useful data transmission channels.

The first state transition criterion provided may be the elapsing of a first prescribed period, which may be measured using one or more appropriately preset timers, for example.

The state transition control unit may also be set up such that the second state transition criterion provided is the elapsing of a second prescribed period, the second period being able to be longer than the first period.

In addition, the state transition control unit may be set up such that the third state transition criterion provided is at least one of the following criteria:
- the overall filling level of all the transmission buffer stores is greater than a prescribed first threshold value;
- at least one filling level of a transmission buffer store is greater than a prescribed second threshold value, for example one which is specific to transmission buffer stores;
- at least one total filling level of a plurality of transmission buffer stores is greater than a prescribed third threshold value, for example one which is specific to group buffer stores.

At least one of the threshold values may be able to be prescribed by another communication device. Thus, if the communication device is a mobile radio communication device, for example, then the other communication device, which prescribes the threshold value(s), may be a mobile radio base station or else a mobile radio network control unit, in general a unit in the mobile radio network.

In addition, the state transition control unit may also be set up such that for the fourth state transition criterion it is checked whether the MAC protocol layer, for example, has sent one or more data packets to the physical layer, for example.

The communication device may have a plurality, for example a multiplicity, of transmission buffer stores, for example a plurality or multiplicity of transmission buffer stores from protocol layer level 2, for example a plurality or multiplicity of transmission buffer stores from the RLC protocol layer level. In other words, in line with this embodiment of the invention, this means that a plurality or multiplicity of RLC transmission buffer stores may be provided.

In line with another embodiment of the invention, provision is made for the state transition control unit to be set up such that the third state transition criterion provided is that at least one total filling level of a plurality of transmission buffer stores is greater than a prescribed third threshold value, with the plurality of transmission buffer stores being grouped on the basis of priorities which are associated with the transmission buffer stores, for example taking account the priorities of data which are to be transmitted using the transmission buffer stores. Thus, the priorities may be associated with the transmission buffer stores on the basis of the quality of service (QoS).

The communication device may be set up as a communication terminal, for example as a mobile radio communication terminal.

In line with one exemplary embodiment of the invention, efficient control and supervision of the activity of a subscriber terminal, for example of a mobile radio communication terminal, is therefore undertaken.

Exemplary embodiments of the invention are illustrated in the figures and are explained in more detail below.

FIG. 1 shows a UMTS mobile radio communication system 100, for reasons of simpler illustration particularly the components of the UMTS mobile radio access network (UMTS Terrestrial Radio Access Network, UTRAN), which has a plurality of mobile radio network subsystems (RNS) 101, 102 which are respectively connected to the UMTS core network (CN) 105 by means of what is known as an Iu interface 103, 104. A mobile radio network subsystem 101, 102 respectively has a mobile radio network control unit (Radio Network Controller, RNC) 106, 107 and one or more UMTS base stations 108, 109, 110, 111, which are also called NodeB on the basis of UMTS.

Within the mobile radio access network, the mobile radio network control units 106, 107 of the individual mobile radio network subsystems 101, 102 are connected to one another by means of an "Iur" interface 112. Each mobile radio network control unit 106, 107 respectively monitors the assignment of mobile radio resources for all the mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of an "Iub" interface 113, 114, 115, 116.

Each UMTS base station 108, 109, 110, 111 provides radio coverage for one or more mobile radio cells (CE) within a mobile radio network subsystem 101, 102. Between a respective UMTS base station 108, 109, 110, 111 and a subscriber terminal 118 (user equipment, UE), subsequently also called mobile radio communication terminal, in a mobile radio cell, message signals or data signals are transmitted using an air interface, called Uu air interface 117 in UMTS, for example using a multiple access transmission method.

By way of example, the UMTS-FDD mode (Frequency Division Duplex) is used to achieve separate signal transmission in the uplink and downlink directions (uplink: signal transmission from the mobile radio communication terminal 118 to the respective UMTS base station 108, 109, 110, 111; downlink: signal transmission from the respective associated UMTS base station 108, 109, 110, 111 to the mobile radio communication terminal 118) through appropriate separate assignment of frequencies or frequency ranges.

A plurality of subscribers, in other words a plurality of activated (or registered in the mobile radio access network) mobile radio communication terminals 118, in the same mobile radio cell preferably have their signaling separated from one another using orthogonal codes, particularly using the "CDMA method" (Code Division Multiple Access).

In this connection, it should be noted that FIG. 1 shows only one mobile radio communication terminal 118 for reasons of simple illustration. In general, however, any number of mobile radio communication terminals 118 are provided in the mobile radio system 100.

The communication between a mobile radio communication terminal 118 and another communication terminal can be set up using a complete mobile radio communication link to another mobile radio communication terminal, alternatively to a landline communication terminal.

Figure 2:
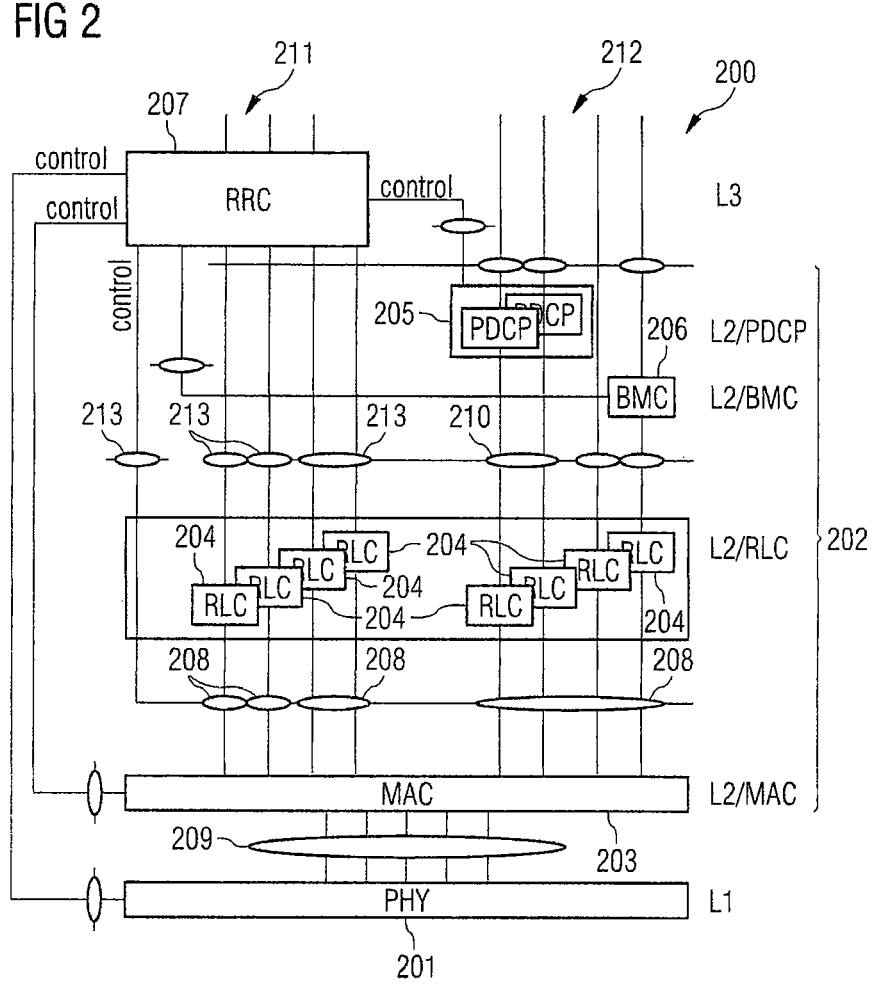
FIG. 2 shows an illustration of a protocol structure from the UMTS air interface.

As FIG. 2 shows, the UMTS air interface 117 is logically divided into three protocol layers (symbolized in FIG. 2 by a protocol layer arrangement 200). The units (entities) ensuring and providing the functionality of the respective protocol layers described below are implemented both in the mobile radio communication terminal 118 and in the UMTS base station 108, 109, 110, 111 or in the respective mobile radio network control unit 106, 107.

FIG. 2 shows the protocol structure 200 from the viewpoint of the dedicated transport channel DCH (dedicated channel).

The bottommost layer shown in FIG. 2 is the physical layer PHY 201, which represents the protocol layer 1 on the basis of the OSI reference model (Open System Interconnection) on the basis of the ISO (International Standardization Organization).

The protocol layer arranged above the physical layer 201 is the data link layer 202, protocol layer 2 on the basis of the OSI reference model, which for its part has a plurality of subprotocol layers, namely the Medium Access Control protocol layer (MAC protocol layer) 203, the Radio Link Control protocol layer 204 (RLC protocol layer), the Packet Data Convergence Protocol protocol layer 205 (PDCP protocol layer), and also the Broadcast/Multicast Control protocol layer 206 (BMC protocol layer).

The topmost layer of the UMTS air interface Uu is the mobile radio network layer (protocol layer 3 on the basis of the OSI reference model), having the mobile radio resource control unit 207 (Radio Resource Control protocol layer, RRC protocol layer).

Each protocol layer 201, 202, 203, 204, 205, 206, 207 provides the protocol layer above it with its services via prescribed, defined service access points.

To provide a better understanding of the protocol layer architecture, the service access points have been provided with generally customary and unambiguous names, such as logical channels 208 between the MAC protocol layer 203 and the RLC protocol layer 204, transport channels 209 between the physical layer 201 and the MAC protocol layer 203, radio bearers (RB) 210 between the RLC protocol layer 204 and the PDCP protocol layer 205 or the BMC protocol layer 206, and also signaling radio bearers (SRB) 213 between the RLC protocol layer 204 and the RRC protocol layer 207.

On the basis of UMTS, the protocol structure 200 shown in FIG. 2 is split not just horizontally into the above-described protocol layers and units of the respective protocol layers, but also vertically into a "control protocol plane" 211 (Control plane, C plane), which contains parts of the physical layer 201, parts of the MAC protocol layer 203, parts of the RLC protocol layer 204 and also the RRC protocol layer 207, and the user protocol plane 212 (User plane, U plane), which contains parts of the physical layer 201, parts of the MAC protocol layer 203, parts of the RLC protocol layer 204, the PDCP protocol layer 205 and also the BMC protocol layer 206.

The units of the control protocol plane 211 are used to transmit exclusively control data, which are required for setting up and clearing down and also maintaining a communication link, whereas the units of the useful plane 212 are used to transport the actual useful data.

Each protocol layer or each unit (entity) of a respective protocol layer has particular prescribed functions during mobile radio communication.

The transmitter end needs to ensure the task of the physical layer 201 or of the units of the physical layer 201, the secure transmission via the air interface 117 of data coming from the MAC protocol layer 203. In this regard, the data are mapped onto physical channels (not shown in FIG. 2). The physical layer 201 provides the MAC protocol layer 203 with its services via transport channels 209 and these are used to stipulate how and with what characteristics the data are to be transported via the air interface 117. The fundamental functions which are provided by the units of the physical layer 201 include channel coding, modulation and CDMA code spreading. Correspondingly, the physical layer 201 or the entities of the physical layer 201 at the receiver end performs the CDMA code despreading, demodulation and the decoding of the received data and then forwards these data to the MAC protocol layer 203 for further processing.

The MAC protocol layer 203 or the units of the MAC protocol layer 203 provides or provide the RLC protocol layer 204 with its or their services using logical channels 208 as service access points and these are used to characterize what type of file the transported data involve. The task of the MAC protocol layer 203 in the transmitter, i.e. during data transmission in the uplink direction in the mobile radio communication terminal 118, is particularly to map the data which are present on a logical channel 208 above the MAC protocol layer 203 onto the transport channels 209 of the physical layer 201. The physical layer 201 provides the transport channels 209 with discrete transmission rates for this. It is therefore an important function of the MAC protocol layer 203 or of the entities of the MAC protocol layer 203 in the mobile radio communication terminal 118 in the transmission situation to select a suitable transport format (TF) for each configured transport channel on the basis of the respective current data transmission rate and the respective data priority of the logical channels 208 which are mapped onto the respective transport channel 209, and also the available transmission power of the mobile radio communication terminal 118 (UE). A transport format contains, inter alia, a stipulation of how many MAC data packet units, called transport block, are transmitted, in other words transferred, to the physical layer 201 via the transport channel 209 per transmission period TTI (Transmission Time Interval). The admissible transport formats and also the admissible combinations of transport formats for the various transport channels 209 are signaled to the mobile radio communication terminal 118 by the mobile radio network control unit 106, 107 when a communication link is set up, in the form of the "Uplink TFCS" (Transport Format Combination Set, a set of permitted transport format combinations). In the receiver, the units of the MAC protocol layer 203 split the transport blocks received on the transport channels 209 over the logical channels 208 again.

The MAC protocol layer or the units of the MAC protocol layer 203 normally has or have various logical units. The "MAC-d unit" (MAC dedicated unit) handles the useful data and the control data, which are mapped onto the dedicated transport channels DCH (Dedicated Channel) via the corresponding dedicated logical channels DTCH (Dedicated Traffic Channel) and DCCH (Dedicated Control Channel). The MAC-c/sh unit (MAC common/shared unit) handles the useful data and the control data from logical channels 208, which are mapped onto the common transport channels 209, such as the common transport channel RACH (Random Access Channel) in the uplink direction or the common transport channel FACH (Forward Access Channel) in the downlink direction. The MAC-b unit (MAC broadcast unit) handles only the mobile radio cell-related system information, which is mapped via the logical channel BCCH (Broadcast Control Channel) onto the transport channel BCH (Broadcast Channel) and is transmitted by broadcast to all of the mobile radio communication terminals 118 in the respective mobile radio cell. The MAC-e/es unit (MAC enhanced/enhanced serving unit) handles the useful data and control data, which are mapped onto the dedicated E-DCH (Enhanced DCH) transport channel via the DTCH and DCCH.

Using the RLC protocol layer 204 or using the units of the RLC protocol layer 204, the RRC protocol layer 207 is provided with its services by means of signaling radio bearers (SRB) 213 as service access points, and the PDCP protocol layer 205 and the BMC protocol layer 206 are provided with their services by means of radio bearers (RB) 210 as service access points. The signaling radio bearers and the radio bearers characterize the way in which the RLC protocol layer 204 needs to handle the data packets. To this end, by way of example, the RRC protocol layer 207 stipulates the transmission mode for each configured signaling radio bearer or radio bearer. The following transmission modes are provided in UMTS:

Transparent mode (TM),
Unacknowledged mode (UM), or
Acknowledged mode (AM).

The RLC protocol layer 204 is modeled such that there is an independent RLC entity for each radio bearer or signaling radio bearer. In addition, the task of the RLC protocol layer or of its entities 204 in the transmission device is to split or assemble the useful data and the signaling data from radio bearers or signaling radio bearers into data packets (also known as Protocol Data Units, PDUs). The RLC protocol layer 204 transfers the data packets produced after the split or the assembly to the MAC protocol layer 203 for further transport or for further processing. In addition, each RLC entity has an associated buffer store which it can control and which buffer-stores the data packets received from higher protocol layers (at the transmitter end, in this case also called transmission buffer store) or from the lower protocol layers (at the receiver end, in this case also called receiver buffer store).

The PDCP protocol layer 205 or the units of the PDCP protocol layer 205 is or are set up to transmit or to receive data from the "Packet Switched Domain" (PS domain). The main function of the PDCP protocol layer 205 is to compress or decompress the IP header information (Internet Protocol header information).

The BMC protocol layer 206 or its entities is or are used to transmit or to receive "cell broadcast messages" via the air interface.

The RRC protocol layer 207 or the entities of the RRC protocol layer 207 is or are responsible for setting up and clearing down and reconfiguring physical channels, transport channels 209, logical channels 208, signaling radio bearers 213 and radio bearers 210 and also for negotiating all of the parameters of the protocol layer 1, i.e. of the physical layer 201 and of the protocol layer 2. To this end, the RRC units, i.e. the units of the RRC protocol layer 207, in the mobile radio network control unit 106, 107 and the respective mobile radio communication terminal 118 interchange appropriate RRC messages, via the signaling radio bearers 213.

For efficient control of the radio resources associated with a UE, a first exemplary embodiment of the invention involves five communication link states being defined in the RRC protocol layer: Idle Mode, CELL_PCH, URA_PCH, CELL_FACH and CELL_DCH, which differ from one another in terms of the nature of the allocated resources, in terms of the activity of the UE and in terms of where or at what level the position of the UE is known.

Figure 3:
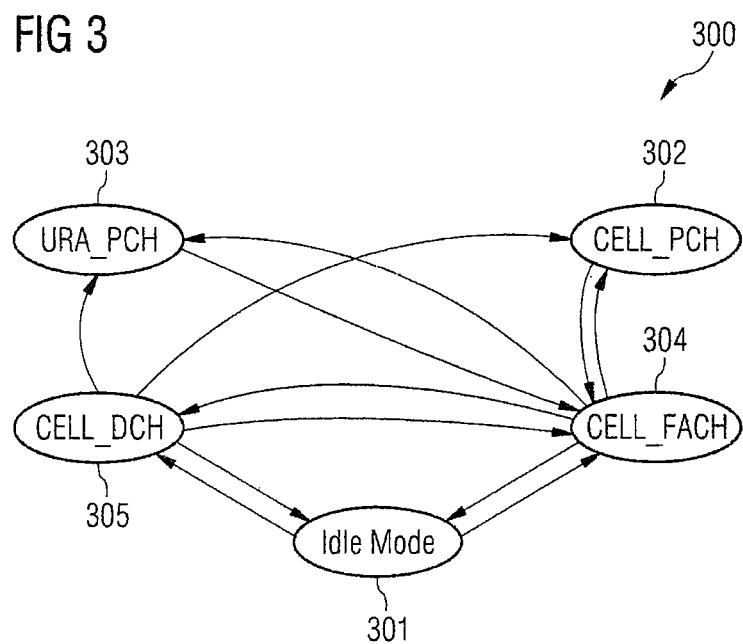
FIG. 3 shows a state diagram for radio resource protocol states and state transitions based on an exemplary embodiment of the invention.

The possible state transitions between the individual RRC states are shown in a first state diagram 300 in FIG. 3.

In a first RRC state Idle Mode 301, there is no signaling communication link and no useful data communication link between the subscriber mobile radio communication terminal (UE) and the RNC. In the mobile radio access network (UTRAN, UMTS Terrestrial Radio Access Network), the subscriber mobile radio communication terminal 118 is not known at all, and in the UMTS Core Network (CN) it is known only at the level of the Routing Area (RA) or the Location Area (LA). In Idle Mode 301, a UE 118 can read the system information on the broadcast channel (BCH) and can receive notifications via the notification channel PCH (Paging Channel).

In a second RRC state CELL_PCH 302, there is just one logical signaling communication link between the subscriber mobile radio communication terminal (UE) and the RNC. In this state, a UE 118 can receive the broadcast messages from the communication network and listens to the shared notification channel PCH. In this state, the position of a UE 118 is known at cell level.

A third RRC state URA_PCH 303 is similar to the second RRC state CELL_PCH, with the difference that the communication network merely knows the group of cells URA (UTRAN Registration Area) which contains the subscriber mobile radio communication terminal (UE) 118.

In a fourth RRC state CELL_FACH 304, there are a signaling communication link and a useful data communication link between the subscriber mobile radio communication terminal (UE) 118 and the RNC. In this state, the UE 118 has associated shared resources which it needs to share with other UEs, e.g. the transport channel RACH in the uplink and the transport channel FACH in the downlink. In this state, the position of the UE 118 is known at cell level.

In a fifth RRC state CELL_DCH 305, there are a signaling communication link and a useful data communication link between the subscriber mobile radio communication terminal (UE) 118 and the RNC. In this state, the UE 118 has associated dedicated resources, and the position of the UE 118 is known at cell level.

Within an existing mobile radio communication link, the RNC adapts the mobile radio resources configured for a UE 118 dynamically on the basis of the respective traffic load in the mobile radio cell and the UE activity, i.e. if a UE 118 in the fifth RRC state CELL_DCH 305 is currently receiving or sending only a little data using the dedicated resources, for example, then the RNC can use explicit signaling at RRC protocol layer level to arrange a state transition for the UE 118 to the fourth RRC state CELL_FACH 304. In this case, the dedicated mobile radio communication link is cleared down, and in the new fourth RRC state CELL_FACH 304 the packet data transmission is then continued using the shared resources. If the UE activity increases again and the respective traffic load in the mobile radio cell so permits, then a new dedicated mobile radio communication link can be set up.

If a mobile radio subscriber in a UMTS mobile radio communication system is using a communication service then the UMTS core network provides this communication service at a defined quality of service (QoS) based on the quality criteria of the relevant communication service.

In a UMTS communication system, the following four traffic classes for classifying communication services are defined, which differ in terms of their specific transmission properties and quality requirements:

First traffic class Conversational:
This traffic class is provided for realtime applications between subscribers. The realtime applications include applications such as voice telephony and video telephony. Communication links from this traffic class require a constant, i.e. guaranteed, transmission rate with short time delays. On the other hand, a Conversational application is insensitive toward brief transmission errors.

Second traffic class Streaming:
This traffic class is provided for realtime distribution communication services such as video or audio, in which data are transmitted unidirectionally, for example from a server to a client, these communication services allowing the receiver to play back the data during the actual transmission. In the case of streaming, a continuous data stream is set up, so that communication links from this traffic class require a constant, i.e. guaranteed, transmission rate. Streaming applications are insensitive toward short transmission delays, however, and in this respect do not make any stringent demands in comparison with the applications from the Conversational traffic class.

Third traffic class Interactive:
This traffic class is provided for interactive applications, such as Internet surfing, games and chat. The communication links from this traffic class do not require a constant transmission rate but make high demands on transmission security, i.e. they require a very low bit error rate.

Fourth traffic class Background:
Applications from this traffic class transmit data with low priority in the background. Examples are download, in other words downloading data, receiving electronic mail (e-mail) and electronic short messages (Short Message Service, SMS). Communication links from this traffic class do not require a constant transmission rate and are insensitive toward time delays. On the other hand, they make high demands on transmission security, i.e. they require a very low bit error rate.

In detail, the quality of service of a communication service is described using different attributes, such as maximum bit rate, guaranteed bit rate or maximum transmission delay. Hence, if the core network provides a mobile radio subscriber with a requested communication service at a defined quality of service QoS then the core network stipulates the associated QoS attributes accordingly.

When a communication connection is set up, the subscriber or his communication terminal is allocated the appropriate radio resources, such as the CDMA spreading codes, by the mobile radio network control unit (RNC) at the UTRAN end and the communication protocols from the protocol layers 1 and 2 are configured, so that the communication service can be guaranteed at the negotiated quality of service for the duration of the communication link. The negotiated quality of service of a communication service can be reconfigured by the core network during communication link, for example on account of scarce radio resources or increasing interference in the mobile radio cell.

The text below proposes embodiments for efficient control and supervision of the activity of a subscriber terminal.

The following embodiments comprise the following features, for example:

A first timer T_inactivity is provided which is used to check the inactivity of a mobile radio communication terminal in a second phase, subsequently referred to as "observation phase", and after whose expiry a third phase, also referred to as "inactivity phase", is initiated. On the basis of the described embodiments of the invention, the first timer T_inactivity is intended to be chosen by respectively taking account of the maximum residence time of the data packets in an RLC buffer store, the maximum residence time being monitored by means of a third timer Timer_discard. Data packets are erased from the respective RLC buffer store when the maximum residence time of the data packets Timer_discard has elapsed.

The first timer T_inactivity is started if the Medium Access Control layer does not use transport channels to send data to the physical layer in a defined time cycle. Accordingly, the first timer T_inactivity is stopped and reset if the Medium Access Control layer uses transport channels to send data to the physical layer again in a defined time cycle before said timer has expired.

A second timer T_activity is provided which is used to stipulate a minimum duration for a first phase, also referred to as "activity phase", in the RRC state CELL_DCH. In line with this embodiment of the invention, the second timer T_activity is intended to be chosen such that it is intended to be respectively greater than or equal to the maximum residence time of the data packets (described by the third timer Timer_discard) in an RLC buffer store. The second timer T_activity is initially started after the communication link setup phase, otherwise generally after an "inactivity phase", if the conditions for the "activity" have been met. Alternatively, the second timer T_activity may be chosen such that it is equal to the duration for executing the data packets in the RLC buffer stores.

In the "inactivity phase", the defined conditions for "activity" are checked using RLC buffer store filling levels. On the basis of different embodiments of the invention, this is done by taking account of the following parameters:
the overall filling level of all the RLC buffer stores;
the individual filling levels of the RLC buffer stores, which are especially taken into account for the activity check;
the group filling level, i.e. the total of the individual filling levels of the RLC buffer stores, which are especially taken into account for the activity check and are grouped into one or more groups;
the network stipulates the logical channels or RLC buffer stores on the basis of which the activity check is performed, for example the logical channels with the highest priorities;
buffer store filling level threshold values are configured for the overall filling level, the individual filling levels and the group filling level.

A mobile radio communication terminal is switched to the state "activity" if at least one of the following buffer store conditions has been met and at the same time the mobile radio communication terminal has sufficient transmission power for data transmission and transmission capacity (for example in the form of an admissible transport format combination):
the individual filling level of at least one RLC buffer store (which is taken into account for the activity check) exceeds the configured first threshold value;
the group filling level, i.e. the total of the individual filling levels of the RLC buffer stores, which are taken into account for the activity check, exceeds the configured second threshold value;
the overall filling level of all the RLC buffer stores exceeds the configured third threshold value, and data are in the RLC buffer stores which are taken into account for the activity check.

The control and supervision of the individual phases, also referred to as useful data transmission states ("activity phase", "observation phase", "inactivity phase") are performed by an MAC control unit (not shown in the figures).

In line with one embodiment of the invention, the parameters T_inactivity, T_activity, the buffer store filling level threshold values and also the stipulation of the logical channels, which are especially taken into account for the activity check, are configured by the network on the basis of the quality of service and are signaled to the mobile radio communication terminal 118.

Advantages of this practice are, by way of example:
The activity or inactivity of a subscriber terminal is stipulated on the basis of the quality of service.
The activity checks are performed by defining time phases which allow efficient control and supervision of the operations.

In addition, it should be pointed out that although the invention is described in connection with a mobile radio communication device, it can also be applied to any other type of communication device, for example a landline communication device.

The text below describes an uplink useful data transmission scenario, shown by way of example in a block diagram 400 in FIG. 4, without restricting the general validity.

Figure 4:
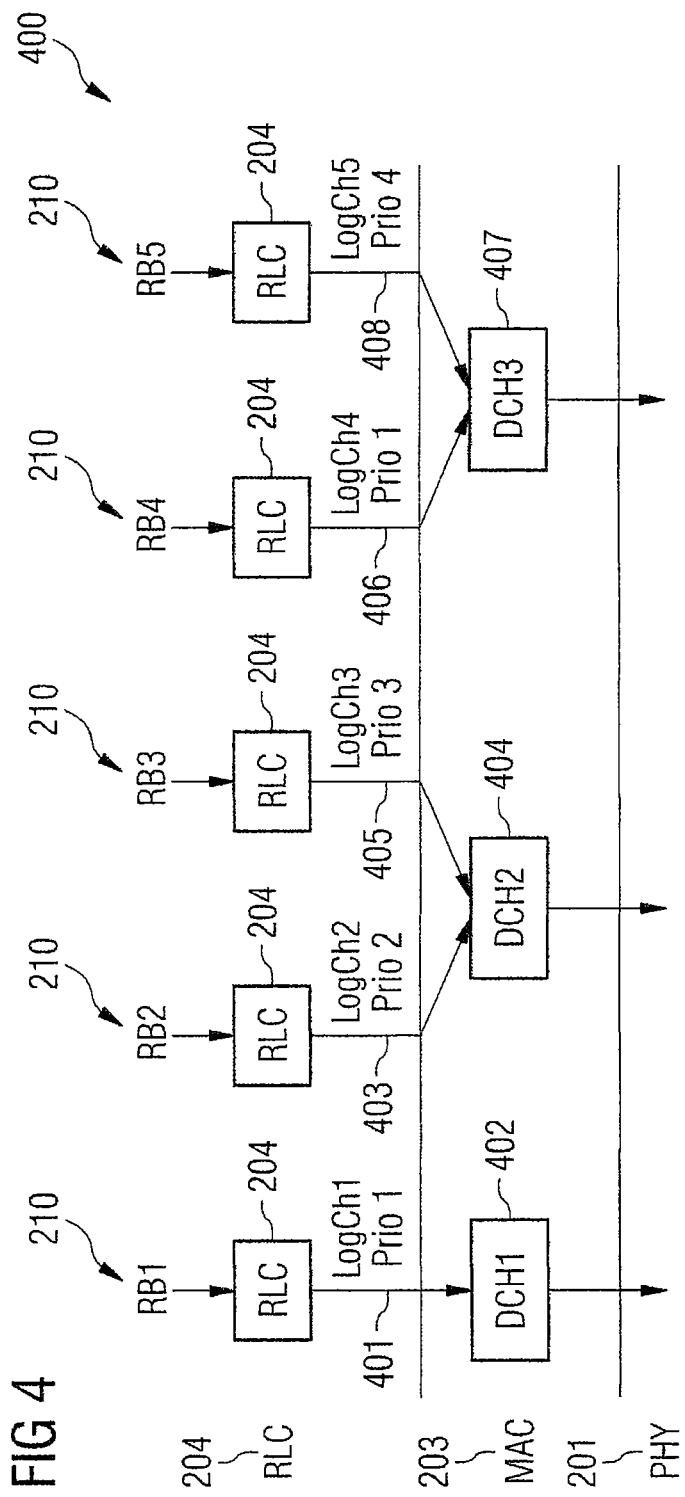
FIG. 4 shows a block diagram showing useful data transmission based on an exemplary embodiment of the invention.

In the exemplary embodiment shown in FIG. 4, it is assumed that a subscriber is using five communication services in parallel, shown in FIG. 4 by means of the radio bearers RB1, RB2, RB3, RB4, RB5 210. For each of these radio bearers 210, an RLC entity 204 with a respective logical channel is configured.

A first logical channel 401, provided for the first radio bearer RB1 210, is mapped on a first transport channel DCH1 402. The first logical channel 401 has an associated priority with the value "1".

A second logical channel 403, which is associated with the second radio bearer RB2 210 and which has an associated priority with the value "2", is mapped on a second dedicated transport channel DCH2 404.

The second transport channel DCH2 404 also has a third logical channel 405 mapped on it which is associated with the third radio bearer RB3 210 and which has an associated priority with the value "3".

A fourth logical channel 406, which is associated with the fourth radio bearer RB4 210 and hence with the fourth communication service and which has an associated priority with the value "1", is mapped on a third transport channel DCH3 407.

The third transport channel DCH3 407 also has a fifth logical channel 408 mapped on it which is associated with the fifth radio bearer RB5 210. The fifth logical channel 408 has an associated priority with the value "4".

On the basis of these embodiments of the invention, a priority with the value "1" means the highest priority for a logical channel and a priority of "4" means the lowest priority for the respective logical channel.

The priority is taken into account in order to control the execution of the data buffer-stored in the RLC buffer stores of the individual RLC entities 204, these data being explained in more detail below. In general, the RLC entity associated with the respective logical channel with the highest priority is executed preferentially.

It is subsequently assumed that the data packets in all the RLC buffer stores are of the same size. In alternative embodiments, the data packets may be of different size, however.

To control and supervise the activity of a mobile radio communication terminal 118, the communication network has configured the following parameters and has signaled them to the mobile radio communication terminal 118, it being necessary to point out that it is possible for any parameters to be signaled to the mobile radio communication terminal 118 by the communication network:

first timer T_inactivity=50 ms;
second timer T_activity=100 ms;
on the basis of their priority, the first logical channel 401 and the fourth logical channel 406, which have both been allocated the highest priority, have been stipulated, in other words selected, for the activity check.

The following buffer store filling level threshold values have been configured for the activity check:
buffer store filling level for the RLC transmission buffer store for the first logical channel 401
LogCh1=2 data packets;
buffer store filling level for the RLC transmission buffer store for the fourth logical channel 406
LogCh4=2 data packets;
group filling level for the total of the RLC transmission buffer stores for the first logical channel 401 and for the fourth logical channel 406
LogCh1+LogCh4=2 data packets;
overall filling level of all the RLC buffer stores for all the logical channels 401, 403, 405, 406, 408
=12 data packets.

On the basis of the configuration of the buffer store filling level threshold values which has been illustrated above, the following conditions are assumed for "activity" by way of example:
the individual filling level of at least one RLC buffer store from the plurality of the RLC buffer stores for the first logical channel 401 LogCh1 or for the fourth logical channel 406 LogCh4 exceeds the configured threshold value of 2 data packets;
the group filling level, i.e. the total of the individual filling levels, of the RLC buffer stores for the first logical channel 401 LogCh1 and for the fourth logical channel 406 LogCh4 exceeds the configured threshold value of 2 data packets;
the overall filling level of all the RLC buffer stores for all the logical channels 401, 403, 405, 406, 408 exceeds the configured threshold value of 12 data packets, and there are data in the RLC buffer stores for the first logical channel 401 LogCh1 or for the fourth logical channel 406 LogCh4.

The mobile radio communication terminal 118 is then switched to "activity" if at the same time the mobile radio communication terminal 118 has sufficient transmission power for data transmission and has sufficient transmission capacity (for example in the form of an admissible transport format combination).

On the basis of this embodiment of the invention, an MAC control unit (not shown in the figures) controls and supervises the individual phases, subsequently also referred to as useful data transmission states ("activity phase", "observation phase", "inactivity phase").

Figure 5:
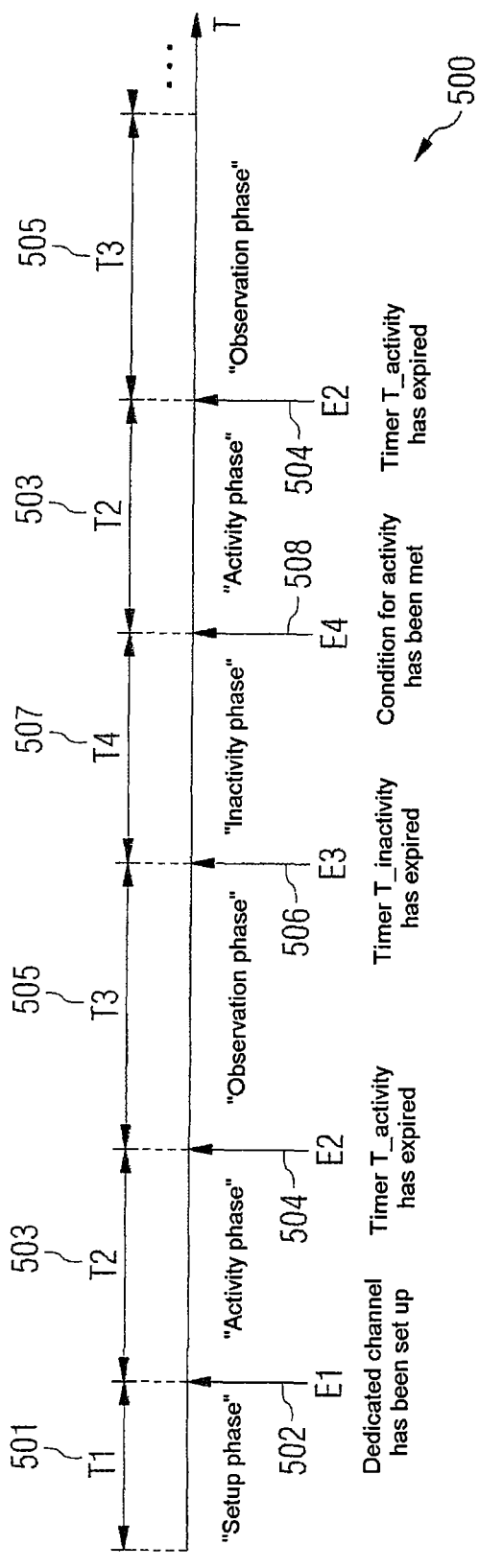
FIG. 5 shows a time diagram for useful data transmission based on an exemplary embodiment of the invention.

FIG. 5 shows a time diagram 500 illustrating an example of the time sequence, including the phases T1 to T4 with the corresponding events E1 to E4 (the events taking place for useful data transmission state transitions on the basis of the state transition criteria).

Figure 6:
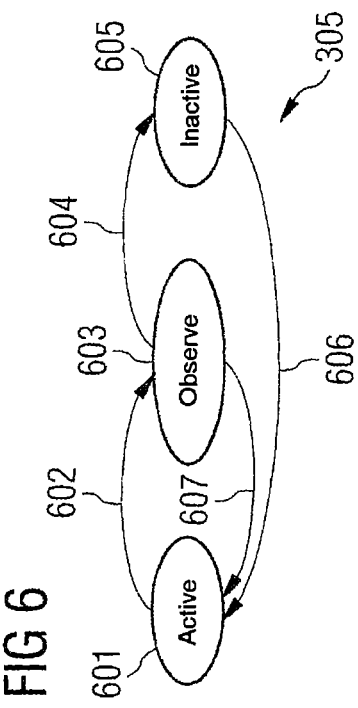
FIG. 6 shows a state diagram for substates and substate transitions from the Radio Resource Protocol state CELL_DCH based on an exemplary embodiment of the invention.

FIG. 6 shows a state diagram illustrating the useful data transmission states from the transmission state CELL_DCH 305 and also the respectively provided state transitions.

Following successful setup of the dedicated mobile radio communication link (phase T1 501) and the occurrence of a first event E1 502, a second phase, the "activity phase" T2 503, is started, with the second timer T_activity being started by the MAC control unit at the same time.

In the "activity phase" T2 503, the MAC protocol layer entity 203 is in a first useful data transmission state 601 within the fifth transmission state CELL_DCH 305 (cf. FIG. 6).

When the second timer T_activity then expires (second event E2 504 occurs), a first state transition 602 from the first useful data transmission state 601 of the "activity phase" T2 503 to a second useful data transmission state 603 takes place (the "observation phase" T3 505).

In the "observation phase" T3 505, a first timer T_inactivity started at the beginning of this phase (alternatively right at the beginning of the "activity phase" T2 503, in which case the first timer T_inactivity needs to be chosen to be correspondingly larger) is used to check the inactivity of the mobile radio communication terminal 118, in other words the first timer T_inactivity is started if the MAC protocol layer is not using transport channels to transmit data to the physical layer in a defined time cycle.

Accordingly, the first timer T_inactivity is stopped and reset if the MAC protocol layer is using transport channels 208 to transmit data to the physical layer 201 again in a defined time cycle before the first timer T_inactivity expires.

FIG. 5 considers the case in which the first timer T_inactivity expires, i.e. the case in which no data have been transmitted from the MAC protocol layer to the physical layer 201 during its runtime.

When the first timer T_inactivity expires (third event E3 506 in FIG. 5), a second state transition 604 takes place from the second useful data transmission state 603 to a third useful data transmission state 605, the "inactivity phase" T4 507. During this phase T4 507, the RLC buffer store filling levels in defined time cycles are used to check whether and possibly when the conditions described above for "activity" are met again. This exemplary embodiment of the invention considers the case in which the condition for "activity" has been met at a time (represented by a fourth event E4 508), so that the activity phase T2 503 is then started again, in other words a third state transition 606 takes place from the third useful data transmission state 605 to the first useful data transmission state 601.

FIG. 5 also shows the fresh occurrence of the second event 504 by way of example, i.e. the fresh expiry of the second timer T_activity and the associated start of a fresh "observation phase" T3 505.

FIG. 6 also shows a fourth useful data transmission state transition 607 which represents the state transition from the second useful data transmission state 603 to the first useful data transmission state 601, in other words the case in which during the "observation phase" T3 505 the MAC protocol layer has transmitted one or more data packets to the physical layer 201, in which case the first timer T_inactivity is stopped and reset and the second timer T_activity is restarted at the beginning of the first useful data transmission state 601.

FIG. 7 shows a diagram 700 illustrating the filling levels of the RLC buffer stores 701, 702, 703, 704, 705 for the respective logical channels 401, 403, 405, 406, 408. In this exemplary case, it is assumed that the mobile radio communication terminal 118 is in the "activity phase" T4 507.

On account of the current RLC buffer store filling levels (the first RLC buffer store 701 contains 3 data packets 706, the second RLC buffer store 701 contains 1 data packet 707, the third RCL buffer store 703 contains 3 data packets 708, the fourth RLC buffer store 704 contains no data packets and the fifth RLC buffer store 705 contains 2 data packets 709), the following two conditions have been met for "activity":

the individual filling level of at least one RLC buffer store (in this case the first RLC buffer store 701) for the first logical channel 401 LogCh1 or for the fourth logical channel 406 LogCh4 exceeds the configured threshold value of 2 data packets (in this case 3 data packets 706);

the group filling level, i.e. the total of the individual filling levels, of the RLC buffer stores 701 and 704 for the first logical channel 401 LogCh1 and the fourth logical channel 406 LogCh4 exceeds the configured threshold value of 2 data packets (in this case 3 data packets 706).

Since it is assumed that the mobile radio communication terminal 118 has sufficient transmission power for data transmission and sufficient transmission capacity (for example in the form of an admissible transport format combination), the MAC control unit accordingly initiates the fourth event E4 508 and starts the "activity phase" T2 503 and thus initiates the third state transition 606 from the third useful data transmission state 605 to the first useful data transmission state 601.

FIG. 8 shows a diagram 800 illustrating the buffer store states of the RLC buffer stores 701, 702, 703, 704, 705 in another exemplary case.

On the basis of this exemplary case, it is assumed that the mobile radio communication terminal 118 is in the "inactivity phase" T4 507 and the RLC buffer stores 701, 702, 703, 704, 705 have the following buffer store states:

the first RLC buffer store 701 contains no data packets;
the second RLC buffer store 702 contains 1 data packet 801;
the third RLC buffer store 703 contains 4 data packets 802;
the fourth RLC buffer store 704 contains no data packets;
the fifth RLC buffer store 705 contains 3 data packets 803.

On the basis of the current RLC buffer store filling levels, as illustrated in FIG. 8, no conditions have been met for "activity", as were formulated above. The mobile radio communication terminal 118 therefore continues to remain in the "inactivity phase" T4 507.

This results from the fact that neither the first RLC buffer store 701 nor the fourth RLC buffer store 704 contains a data packet (individual filling levels of these RLC buffer stores 701, 704 are equal to zero), which means that the group filling level is also equal to zero. The total of all the RLC buffer filling levels (in this case 8) is also below the prescribed threshold value.

Figure 9:
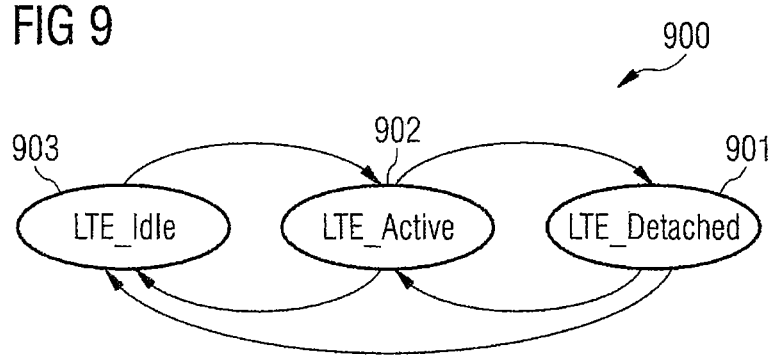
FIG. 9 shows a state diagram for Radio Resource Protocol states and state transitions based on another exemplary embodiment of the invention.

FIG. 9 shows a second state diagram 900 illustrating a second exemplary embodiment for the mobile radio resource control with just three RRC states, the admissible state transitions being symbolized by means of arrows:

A subscriber mobile radio communication terminal (UE) 118 is in a first LTE-RRC state LTE_Detached 901 directly after it is turned on. In this state, there is no signaling communication link and no useful data communication link between the UE 118 and the communication network. In addition, the UE 118 is not known in the communication network but can read the system information on the broadcast channel BCH.

In a second LTE-RRC state LTE_Active 902, there are a signaling communication link and a useful data communication link between the UE 118 and the communication network. In this state, the UE 118 has associated shared resources and the position of the UE 118 is known at cell level.

In a third LTE-RRC state LTE_Idle 903, there is just a signaling communication link between the UE 118 and the communication network. In this state, a UE 118 can read the system information on the broadcast channel BCH and can receive the notification channel PCH. In addition, the network knows the position of a UE 118 at cell group level.

Figure 10:
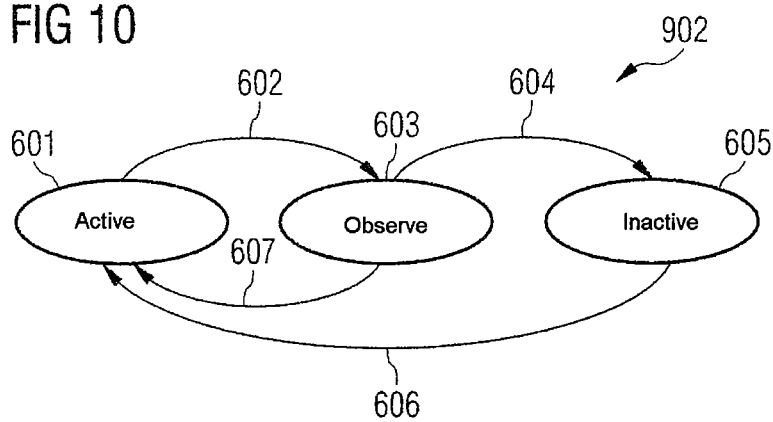
FIG. 10 shows a state diagram for substate and substate transitions from the Radio Resource Protocol state LTE_Active based on an exemplary embodiment of the invention.

FIG. 10 shows the useful data transmission states from the LTE-RRC state LTE_Active 902 in detail. The useful data transmission states based on this exemplary embodiment of the invention are in line with the useful data transmission based on the first exemplary embodiment of the invention, which is why another detailed description is not given. The same reference symbols are also used in this connection.

In summary, the following exemplary features of embodiments of the invention should be pointed out:

Two timers are defined, a first timer T_inactivity and a second timer T_activity, which are firstly used to check the inactivity of a subscriber terminal in an "observation phase", the "inactivity phase" being initiated after the first timer T_inactivity has expired. Secondly, a minimum duration for the "activity phase" is stipulated by means of the second timer T_activity.

In the "inactivity phase", the defined conditions for "activity" and the relevant state transition are checked on the basis of the RLC buffer store filling levels and appropriate state transition criteria.

The individual phases ("activity phase", "observation phase", "inactivity phase") are controlled and supervised by an MAC control unit.

The parameters T_inactivity, T_activity, the buffer store filling level threshold values and the stipulation of the logical channels, which are especially taken into account for the activity check, can be configured by the communication network on the basis of the quality of service and signaled to the mobile radio communication terminal 118.

In addition, it should be pointed out that the state machine and the check on the respective state transition criteria can be implemented or performed by the communication network, and only the information about the respective state transition is signaled to the mobile radio communication terminal 118. In this case, it is merely necessary to signal the statement indicating the respective RLC buffer store filling levels in the mobile radio communication terminal 118 to the mobile radio communication network.

What is claimed is:

1. A communication device comprising:
a state control unit which can operate the communication device in at least three useful data transmission states that include:
an active data transmission state of a data link layer, in which a first useful data communication link with first communication resources is allocated to the communication device, an observe data transmission state of the data link layer, in which a second useful data communication link with the first communication resources is allocated to the communication device, and an inactive data transmission state of the data link layer, in which a useful data communication link with second communication resources is allocated to the communication device, the second communication resources being fewer than the first communication resources;

a first timer, associated with the observe data transmission state, to start based on use of one or more transport channels by a Medium Access Control layer to send data to a physical layer;

a second timer, associated with the active data transmission state, to initially start after the first useful data communication link allocation with the first communication resources; and a state transition control unit which can perform at least the following state transitions:

a state change from the active data transmission state to the observe data transmission state at expiry of the second timer, a state change from the observe data transmission state to the inactive data transmission state at expiry of the first timer, a state change from the inactive data transmission state to the active data transmission state when a first state transition criterion has been met, and a state change from the observe data transmission state to the active data transmission state when a second state transition criterion has been met, wherein the first state transition criterion and the second state transition criterion are based on an activity or inactivity of the communication device, and wherein the three useful data transmission states are substates from at least one of a CELL_DCH state or a Long_Term_Evolution_Active state.

2. The communication device as claimed in claim 1, wherein the communication device is a radio communication device, and the first communication resources and the second communication resources are radio communication resources.

3. The communication device as claimed in claim 1, wherein the communication device is a mobile radio communication device, and the first communication resources and the second communication resources are mobile radio communication resources.

4. The communication device as claimed in claim 3, wherein the active, inactive, and observe data transmission states are states from the Medium Access Control layer.

5. The communication device as claimed in claim 1, further comprising a Medium Access Control layer control unit which has the state transition control unit.

6. The communication device as claimed in claim 1, wherein the state control unit can operate the communication device in precisely the active, inactive, and observe data transmission states.

7. The communication device as claimed in claim 1, wherein the active, inactive, and observe data transmission states are substates from a first transmission state from a plurality of transmission states.

8. The communication device as claimed in claim 7, wherein the first transmission state is a state in which the communication device has set up at least one signaling communication link.

9. The communication device as claimed in claim 8, wherein the first transmission state is a state in which the communication device has associated dedicated communication resources.

10. The communication device as claimed in claim 8, wherein a second transmission state from the plurality of transmission states is a state in which the communication device has set up at least one signaling communication link.

11. The communication device as claimed in claim 10, wherein the second transmission state is a state in which the communication device has associated shared communication resources to which other communication devices also have access.

12. The communication device as claimed in claim 11, wherein the second transmission state is a CELL_FACH state or a Long_Term_Evolution_Idle state.

13. The communication device as claimed in claim 1, further comprising at least one of the three useful transmission states in which the communication device can be operated selected from a group consisting of CELL_PCH, URA_PCH, and Idle Mode.

14. The communication device as claimed in claim 1, further comprising a Long_Term_Evolution_Detached state in which the communication device can be operated.

15. The communication device as claimed in claim 1, wherein the first communication resources and the second communication resources comprise access to physical control channels.

16. The communication device as claimed in claim 15, wherein the access to physical control channels is restricted for the second communication resources in comparison with the first communication resources.

17. The communication device as claimed in claim 1, wherein the second state transition criterion is based on transmission of at least one data packet by the Medium Access Control layer to the physical layer, the transmission of the at least one data packet to reset the first timer and restart the second timer.

18. The communication device as claimed in claim 1, wherein the first state transition criterion provided is at least one of a criteria selected from a group consisting of:
an overall filling level of all transmission buffer stores is greater than a prescribed first threshold value;
at least one filling level of a transmission buffer store is greater than a prescribed second threshold value;
and at least one total filling level of a plurality of transmission buffer stores is greater than a prescribed third threshold value.

19. The communication device as claimed in claim 18, wherein the first state transition criterion provided is that the at least one filling level of the transmission buffer store is greater than the prescribed second threshold value which is specific to transmission buffer stores.

20. The communication device as claimed in claim 18, wherein the first state transition criterion provided is that the at least one total filling level of the plurality of transmission buffer stores is greater than the prescribed third threshold value which is specific to group buffer stores.

21. The communication device as claimed in claim 18, wherein at least one of the prescribed first threshold value, the prescribed second threshold value and the prescribed third threshold value can be prescribed by another communication device.

22. The communication device as claimed in claim 21, wherein the other communication device is a communication network unit.

23. The communication device as claimed in claim 21, wherein the other communication device is a mobile radio network control unit.

24. The communication device as claimed in claim 1, further comprising a plurality of transmission buffer stores.

25. The communication device as claimed in claim 24, wherein at least a portion of the transmission buffer stores is or are RLC buffer stores.

26. The communication device as claimed in claim 18, wherein the first state transition criterion provided is that the at least one total filling level of the plurality of transmission buffer stores is greater than the prescribed third threshold value, and wherein the plurality of transmission buffer stores is grouped based on priorities which are associated with the transmission buffer stores.

27. The communication device as claimed in claim 26, wherein the priorities are associated with the transmission buffer stores based on quality of service.

28. The communication device as claimed in claim 1, wherein the communication device is a communication terminal.

29. A method for operating a communication device, comprising:
operating the communication device in an active data transmission state of a data link layer, in which a first useful data communication link with first communication resources is allocated to the communication device;
performing, by the communication device, a state change from the active data transmission state to an observe data transmission state of the data link layer based on expiry of an activity timer associated with the active data transmission state, wherein in the observe data transmission state a second useful data communication link with the first communication resources is allocated to the communication device;
performing, by the communication device, a state change from the observe data transmission state to an inactive data transmission state of the data link layer based on expiry of an inactivity timer associated with the observe data transmission state, wherein in the inactive data transmission state a useful data communication link with second communication resources is allocated to the communication device, the second communication resources being fewer than the first communication resources;
performing, by the communication device, a state change from the inactive data transmission state to the active data transmission state when a first state transition criterion has been met; and
performing, by the communication device, a state change from the observe data transmission state to the active data transmission state when a second state transition criterion has been met, wherein the first state transition criterion and the second state transition criterion are based on an activity or inactivity of the communication device, wherein the active data transmission state, the observe data transmission state, and the inactive data transmission state are substates from a first radio resource control ("RRC") protocol state from a plurality of RRC protocol states, the plurality of RRC protocol states to include at least one of a CELL_DCH state or a Long_Term_Evolution_Active state.

30. A computer program element including a non-transitory memory for storing instructions which, when executed by a processor, comprises:
operating a communication device in an active data transmission state of a data link layer, in which a first useful data communication link with first communication resources is allocated to the communication device;
performing, by the communication device, a state change from the active data transmission state to an observe data transmission state of the data link layer based on expiry of an active timer associated with the active data transmission state, wherein in the observe data transmission state a second useful data communication link with the first communication resources is allocated to the communication device;
performing, by the communication device, a state change from the observe data transmission state to an inactive data transmission state of the data link layer based on expiry of an inactivity timer associated with the active data transmission state, wherein in the inactive data transmission state a useful data communication link with second communication resources is allocated to the communication device, the second communication resources being fewer than the first communication resources;
performing, by the communication device, a state change from the inactive data transmission state to the active data transmission state when a first state transition criterion has been met; and
performing, by the communication device, a state change from the observe data transmission state to the active data transmission state when a second state transition criterion has been met, wherein the first state transition criterion and the second state transition criterion are based on an activity or inactivity of the communication device, wherein the active data transmission state, the observe data transmission state and the inactive data transmission state are substates from a first radio resource control ("RRC") protocol state from a plurality of RRC protocol states, the plurality of RRC protocol states to include at least one of a CELL_DCH state or a Long_Term_Evolution_Active state.

31. A communication device comprising:
a state control means for operating the communication device in at least three useful data transmission states that include:
an active data transmission state of a data link layer, in which a first useful data communication link with first communication resources is allocated to the communication device,
an observe data transmission state of the data link layer, in which a second useful data communication link with the first communication resources is allocated to the communication device, and
an inactive data transmission state of the data link layer, in which a useful data communication link with second communication resources is allocated to the communication device, the second communication resources being fewer than the first communication resources;
a first timer, associated with the observe data transmission state, to start based on use of one or more transport channels by a Medium Access Control layer to send data to a physical layer;
a second timer, associated with the active data transmission state, to initially start after the first useful data communication link allocation with the first communication resources; and
a state transition control means for performing at least the following state transitions:

a state change from the active data transmission state to the observe data transmission state at expiry of the second timer, a state change from the observe data transmission state to the inactive data transmission state at expiry of the first timer, a state change from the inactive data transmission state to the active data transmission state when a first state transition criterion has been met, and a state change from the observe data transmission state to the active data transmission state when a second state transition criterion has been met, wherein the first state transition criterion and the second state transition criterion are based on an activity or inactivity of the communication device, wherein the three useful data transmission states are substates from a first radio resource control ("RRC") protocol state from a plurality of RRC protocol states, the plurality of RRC protocol states to include at least one of a CELL_DCH state or a Long_Term_Evolution_Active state.

* * * * *